(12) United States Patent
Yin et al.

(10) Patent No.: US 12,549,869 B2
(45) Date of Patent: Feb. 10, 2026

(54) IMAGE SENSING STRUCTURE AND IMAGE SENSING DEVICE COMPRISING THE SAME

(71) Applicant: Guangzhou Tyrafos Semiconductor Technologies Co., Ltd., Guangzhou (CN)

(72) Inventors: Ping-Hung Yin, Hsinchu (TW); Jia-Shyang Wang, Miaoli County (TW); Yu Hsiang Wang, Hsinchu (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 279 days.

(21) Appl. No.: 18/144,876

(22) Filed: May 9, 2023

(65) Prior Publication Data
US 2023/0388679 A1 Nov. 30, 2023

Related U.S. Application Data

(60) Provisional application No. 63/345,920, filed on May 26, 2022.

(51) Int. Cl.
| | |
|---|---|
| *H04N 25/47* | (2023.01) |
| *G06T 5/50* | (2006.01) |
| *H04N 7/01* | (2006.01) |
| *H04N 23/56* | (2023.01) |
| *H04N 23/70* | (2023.01) |
| *H04N 23/73* | (2023.01) |
| *H04N 23/741* | (2023.01) |

(Continued)

(52) U.S. Cl.
CPC .............. *H04N 25/533* (2023.01); *G06T 5/50* (2013.01); *H04N 7/0127* (2013.01); *H04N 23/56* (2023.01); *H04N 23/70* (2023.01); *H04N 23/73* (2023.01); *H04N 23/741* (2023.01); *H04N 23/76* (2023.01); *H04N 23/951* (2023.01); *H04N 25/47* (2023.01); *H04N 25/50* (2023.01); *H04N 25/535* (2023.01); *H04N 25/58* (2023.01); *H04N 25/583* (2023.01); *H04N 25/59* (2023.01); *H04N 25/75* (2023.01); *H04N 25/77* (2023.01); *H04N 25/78* (2023.01); *G06T 2207/20208* (2013.01); *G06T 2207/20221* (2013.01)

(58) Field of Classification Search
CPC ...... H04N 25/47; H04N 25/616; H04N 25/65; H04N 25/707; H04N 25/771; H04N 25/78
USPC ......................................................... 348/294
See application file for complete search history.

(56) References Cited

U.S. PATENT DOCUMENTS

| | | | |
|---|---|---|---|
| 2008/0231737 A1* | 9/2008 | Weale ............... | H04N 25/00 348/E3.018 |
| 2013/0277539 A1* | 10/2013 | Smilansky .......... | H04N 25/771 250/214 DC |

(Continued)

*Primary Examiner* — Anthony J Daniels

(57) ABSTRACT

The present invention relates to an image sensing structure, including: a sensing circuit, a storage circuit and a processing circuit. The sensing circuit is used to generate multiple sensing signals in different periods; the storage circuit is used to store the sensing signals. The storage circuit sequentially outputs a first sensing signal of a target object in a first period and a second sensing signal of the target object in a second period to the processing circuit. The processing circuit performs dynamic event detection processing through the first sensing signal and the second sensing signal. Also, the present invention relates to an image sensing device including the image sensing structure.

10 Claims, 7 Drawing Sheets

(51) Int. Cl.
　　　*H04N 23/76* 　　(2023.01)
　　　*H04N 23/951* 　(2023.01)
　　　*H04N 25/50* 　　(2023.01)
　　　*H04N 25/533* 　(2023.01)
　　　*H04N 25/535* 　(2023.01)
　　　*H04N 25/58* 　　(2023.01)
　　　*H04N 25/583* 　(2023.01)
　　　*H04N 25/59* 　　(2023.01)
　　　*H04N 25/75* 　　(2023.01)
　　　*H04N 25/77* 　　(2023.01)
　　　*H04N 25/78* 　　(2023.01)

(56) References Cited

U.S. PATENT DOCUMENTS

| | | | |
|---|---|---|---|
| 2019/0052820 A1* | 2/2019 | Berner | H04N 25/44 |
| 2020/0358977 A1* | 11/2020 | Niwa | H04N 25/79 |
| 2022/0150432 A1* | 5/2022 | Wang | G05F 1/56 |
| 2022/0150433 A1* | 5/2022 | Fu | H04N 23/60 |
| 2022/0239851 A1* | 7/2022 | Brändli | H04N 25/707 |

\* cited by examiner

IMAGE SENSING STRUCTURE AND IMAGE SENSING DEVICE COMPRISING THE SAME

CROSS-REFERENCE TO RELATED APPLICATION

This application claims priority of U.S. provisional application No. 63/345,920, filed on May 26, 2022, the content of which is incorporated herein in its entirety by reference.

BACKGROUND OF THE INVENTION

1. Field of the Invention

The present invention relates generally to an image sensing structure, and more particularly, to an image sensing structure and an image sensing structure device comprising the image sensing structure.

2. The Prior Arts

In recent years, the demand of the self-driving car industry has become increasingly vigorous. For self-driving cars, an image sensor for detecting real-time road conditions is an essential component. The dynamic vision sensor (DVS) is a mainstream image sensor used for detecting real-time road conditions. The reason is that the DVS records images in units of events. This dynamic event-based sensor brings machine autonomy closer to reality, making it suitable for vision-based high-speed applications in the field of autonomous vehicles.

At present, a DVS combined with a complementary metal oxide semiconductor image sensor (CMOS Image Sensor, CIS) is a type of DVS commonly used on the market. Currently, the general CIS stores the sensing signal output by the pixel unit in digital form, so the general CIS needs to be equipped with a frame buffer.

However, with the trend of miniaturization of electronic devices, the CIS with a frame buffer cannot effectively reduce the volume. In general, the image sensors used for image sensing of automobiles, medical, and surveillance cameras are small, low voltage, and low power consumption sensors. As such, how to save the space and cost of the CIS is one of the issues that developers should solve.

Therefore, the present invention is proposed to address the above-mentioned deficiency.

SUMMARY OF THE INVENTION

A primary objective of the present invention is to provide an image sensing structure, which has a sensing circuit, a storage circuit and a processing circuit. The image sensing structure can generate sensing signals of different periods through the sensing circuit, store the sensing signals in the storage circuit respectively, and finally directly generate the difference between the sensing signals through the processing circuit, and perform dynamic event detection processing. As such, the image sensing structure of the present invention can perform subtraction operation when the sensing signal is in an analog format, and there is no need to additionally set up a digital frame buffer to store the sensing signal, therefore, effectively reducing the space and cost of the image sensor.

In order to achieve the foregoing objective, the present invention provides an image sensing structure, applicable to an environment of sensing a target object. The image sensing structure includes: a sensing circuit, used to generate a plurality of sensing signals of different periods; a storage circuit, coupled to the sensing circuit and used for storing the sensing signals; a processing circuit, coupled to the storage circuit and receiving the sensing signals from the storage circuit; wherein, the storage circuit sequentially outputting a first sensing signal of the target object in a first period and a second sensing signal of a second period, and the processing circuit using the first sensing signal and the second sensing signal to perform a dynamic event detection process.

In a preferred embodiment of the image sensing structure of the present invention, the dynamic event detection processing is to detect whether a difference between the first sensing signal and the second sensing signal falls within a light-changing interval; when falling into the light-changing interval, the processing circuit recognizes that the target object is in a moving state, and when not falling in the light-changing interval, the processing circuit recognizes that the target object is in a stationary state.

In a preferred embodiment of the image sensing structure of the present invention, the sensing circuit includes: a sensing diode; a sensing transmission circuit, coupled to the sensing diode; a sensing reset circuit, coupled to the sensing diode; wherein, the sensing reset circuit is used to receive a sensing reset signal, and the sensing transmission circuit is used to receive a first sensing readout signal and a second sensing readout signal, a first time difference between the sensing reset signal and the first sensing readout signal is the first period, a second time difference between the sensing reset signal and the second sensing readout signal is the second period.

In a preferred embodiment of the image sensing structure of the present invention, the storage circuit includes: a plurality of storage diodes, coupled to the sensing transmission circuit, the plurality of storage diodes respectively storing the sensing signals of different periods; a plurality of storage transmission circuits, respectively coupled to the storage diodes; a storage reset circuit, coupled to the storage transmission circuits; wherein, the storage reset circuit is used to receive a storage reset signal, the storage reset circuit is used to reset the storage diodes, and the storage transmission circuits are used to receive a plurality of storage readout signals, and the storage readout signals respectively trigger the storage diodes to transmit the stored sensing signals to the processing circuit.

In a preferred embodiment of the image sensing structure of the present invention, the processing circuit includes a dynamic offset cancellation circuit for eliminating the offset generated by the comparator in the dynamic offset cancellation circuit and subtracting analog signals of the first sensing signal and the second sensing signal to obtain a difference; wherein, the dynamic offset cancellation circuit receives a first comparison reset signal and a second comparison reset signal, and the first comparison reset signal and the second comparison reset signal are respectively used to reset a first capacitor and a second capacitor in an output offset storage circuit, the first capacitor and the second capacitor are used to store circuit offset, the first sensing signal, and the difference between the first sensing signal and the second sensing signals.

In a preferred embodiment, the image sensing structure of the present invention is applied to a CMOS image sensor (CIS).

In a preferred embodiment of the image sensing structure of the present invention, the image sensing structure is located in a pixel array that further comprises at least a sensing sub-pixel set, wherein each at least a sensing sub-pixel set comprises a first sensing sub-pixel and a second sensing sub-pixel, the first sensing sub-pixel and the second sensing sub-pixel can respectively generate the first sensing signal of the first period and the second sensing signal of the second period, the image sensing structure performs analog signal subtraction on the first sensing signal and the second sensing signal, and respectively output the difference between the first sensing signal and the second sensing signal of a single sub-pixel; wherein, the sensing circuit comprises a sensing transmission circuit, the sensing transmission circuit comprises a plurality of metal-oxide-semiconductor field-effect transistors (MOSFET) to respectively receive different sensing readout signals, so that the sensing transmission circuit can transmit the sensing signals of different periods to the storage circuit according to the sequence of the different sensing readout signals, and the storage circuit has a plurality of storage diodes for storing the sensing signals; wherein, the storage circuit is located in the pixel array, and the storage circuit further comprises a storage transmission circuit, the storage transmission circuit comprises a plurality of MOSFETs, and is coupled to a floating diffusion node; wherein, the processing circuit comprises a dynamic offset cancellation circuit for eliminating the offset generated by the comparator in the dynamic offset cancellation circuit and performing subtraction on the analog signals of the first sensing signal and the second sensing signal of the single sub-pixel to obtain the difference; wherein, the image sensing structure further comprises a ramp circuit, coupled to the floating diffusion node, and the ramp circuit is used for converting the voltage signal of the floating diffusion node from analog to digital signal.

Also, in order to achieve the foregoing objective, the present invention further provides an image sensing device based on the above image sensing structure, comprising: a pixel array, including a plurality of sensing sub-pixel sets; and a conversion circuit, coupled to the pixel array, for converting the sensing signals generated by the sensing sub-pixel sets into digital pixel values.

In a preferred embodiment of the image sensing device of the present invention, the pixel array performs a first global shutter exposure operation during the first period, and performs a second global shutter exposure operation during the second period.

In a preferred embodiment of the image sensing device of the present invention, the processing circuit of the sensing sub-pixel sets performs a rolling readout operation.

In a preferred embodiment, the image sensing device of the present invention is a dynamic vision sensor (DVS).

In a preferred embodiment of the image sensing device of the present invention, the aforementioned image sensing structure is located in a pixel array that further comprises at least a sensing sub-pixel set, wherein each at least a sensing sub-pixel set comprises a first sensing sub-pixel and a second sensing sub-pixel, the first sensing sub-pixel and the second sensing sub-pixel can respectively generate the first sensing signal of the first period and the second sensing signal of the second period, analog signal subtraction is performed on the first sensing signal and the second sensing signal, and the first sensing sub-pixel and the second sensing sub-pixel respectively output the difference between the first sensing signal and the second sensing signal of a single sub-pixel; wherein, the sensing circuit comprises a sensing transmission circuit, the sensing transmission circuit comprises a plurality of metal-oxide-semiconductor field-effect transistors (MOSFET) to respectively receive different sensing readout signals, so that the sensing transmission circuit can transmit the sensing signals of different periods to the storage circuit according to the sequence of the different sensing readout signals, and the storage circuit has a plurality of storage diodes for storing the sensing signals; wherein, the storage circuit is located in the pixel array, and the storage circuit further comprises a storage transmission circuit, the storage transmission circuit comprises a plurality of MOSFETs, and is coupled to a floating diffusion node; wherein, the processing circuit comprises a dynamic offset cancellation circuit for eliminating the offset generated by the comparator in the dynamic offset cancellation circuit and performing subtraction on the analog signals of the first sensing signal and the second sensing signal of the single sub-pixel to obtain the difference.

In summary, the image sensing structure and the image sensing device of the present invention can generate sensing signals of different periods through the sensing circuit, store the sensing signals in the storage circuit respectively, and finally uses the processing circuit directly to generate the difference between the sensing signals, and performs dynamic event detection processing. Thereby, the image sensing structure according to the present invention can perform subtraction operation when the sensing signals are in analog format without additionally setting up a digital frame register to store the sensing signal, and thus effectively reducing the space of the image sensor and cost. In addition, the image sensing structure can also effectively save the operation steps and time of image capture performed by the image sensor when performing dynamic event judgment, and can effectively save the power of the image sensing device.

In order to make those skilled in the art understand the objectives, characteristics and effects of the present invention, the present invention is described in detail below by the following specific embodiments, and in conjunction with the attached drawings.

DETAILED DESCRIPTION OF THE PREFERRED EMBODIMENT

Figure 1:
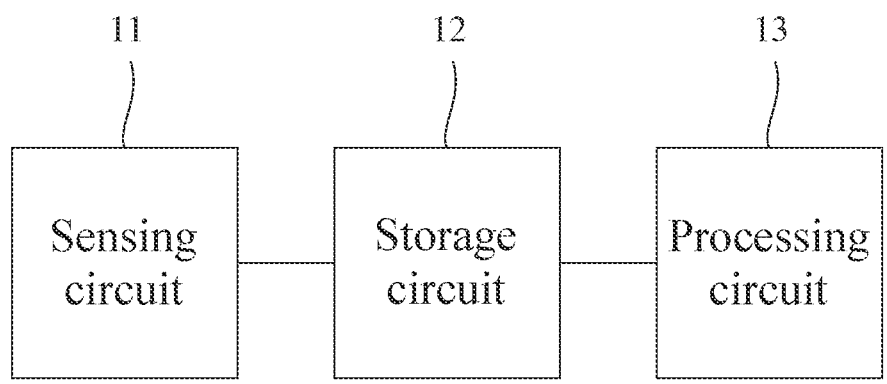
FIG. 1 is a schematic view showing an image sensing structure according to a first embodiment of the present invention.

The accompanying drawings are included to provide a further understanding of the invention, and are incorporated in and constitute a part of this specification. The drawings illustrate embodiments of the invention and, together with the description, serve to explain the principles of the invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

Figure 2:
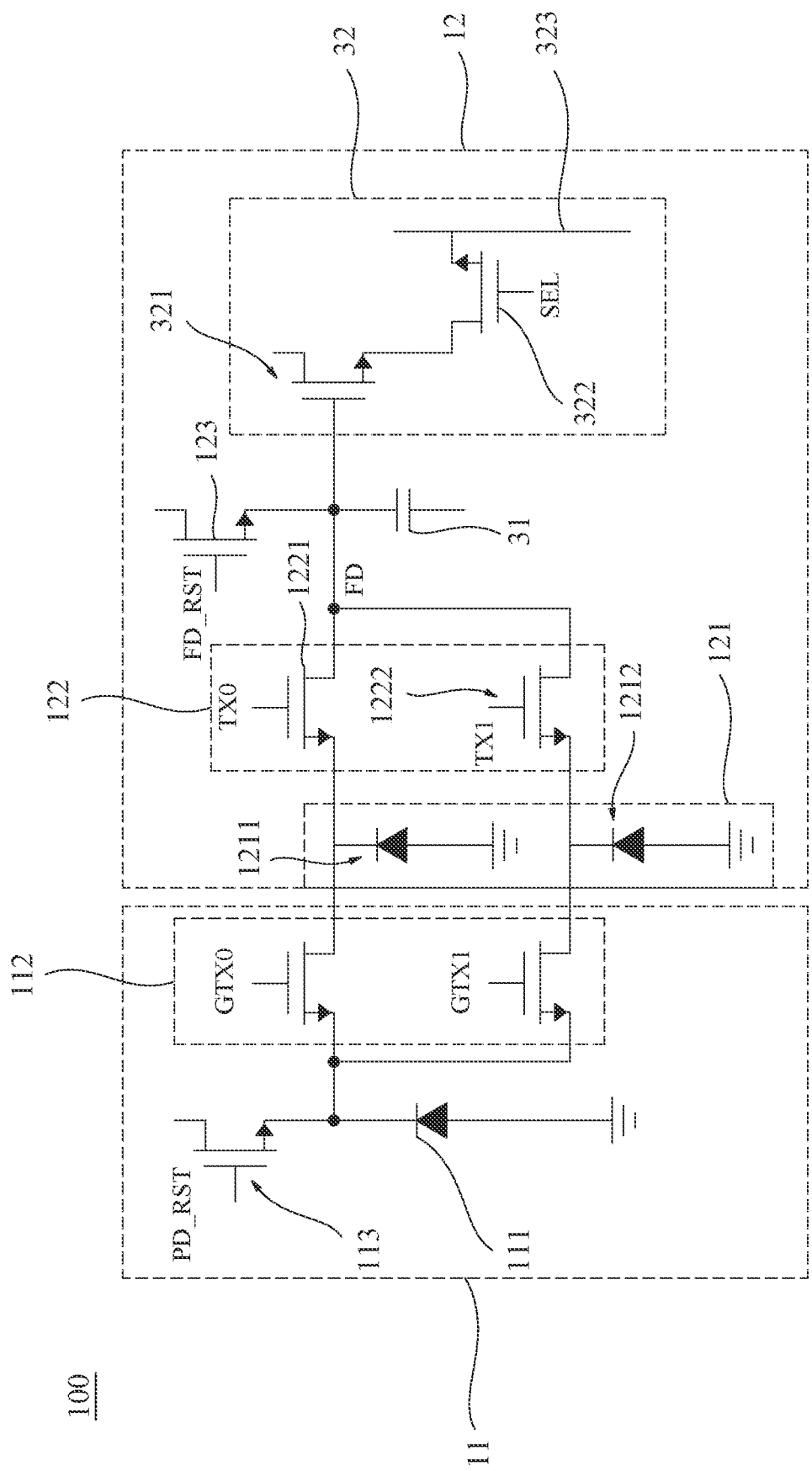
FIG. 2 is a circuit diagram of an image sensing structure according to the first embodiment of the present invention

Refer to FIGS. 1-2. FIG. 1 is a schematic view of an image sensing structure according to a first embodiment of the present invention; FIG. 2 is a circuit diagram of an image sensing structure according to the first embodiment of the present invention. As shown in FIG. 1, the image sensing structure 100 according to the first embodiment of the present invention includes: a sensing circuit 11, a storage circuit 12, and a processing circuit 13.

Specifically, the image sensing structure 100 according to the first embodiment of the present invention is applicable to an environment of sensing a target object. Specifically, in some embodiments, the image sensing structure 100 can be used in a CMOS image sensor (CIS) or a charge coupled device (CCD), but the present invention is not limited thereto.

Specifically, as shown in FIGS. 1-2, the sensing circuit 11 according to the first embodiment of the present invention is mainly used to generate a plurality of sensing signals of different time periods. In the present embodiment, the sensing circuit 11 includes a sensing diode 111, a sensing transmission circuit 112, and a sensing reset circuit 113. The sensing diode 111 is coupled to the sensing transmission circuit 112 and the sensing reset circuit 113. The sensing diode 111 is mainly used to perform photoelectric conversion to convert an incident light into a quantum charge (that is, electrons) according to the intensity of the incident light; the sensing transmission circuit 112 is mainly controlled by sensing readout signals (GTX0, GTX1) to control the charge transfer between the sensing diode 111 and the storage circuit 12; and, the sensing reset circuit 113 is mainly controlled by a sensing reset signal PD_RST to reset the stored charge in the sensing diode 111. It can be understood that the sensing circuit 11 of the first embodiment of the present invention can generate a plurality of sensing signals of different periods through sensing the readout signal and the sensing reset signal, and store the generated sensing signals in the storage circuit 12 respectively. More specifically, as shown in FIG. 2, the sensing transmission circuit 112 of the present invention may include a plurality of metal-oxide-semiconductor (MOS) field-effect transistors (MOSFET) to receive different sensing readout signals, so that the sensing transmission circuit 112 can sequentially transmit the sensing signals of different periods to the storage circuit 12 according to the sensing readout signals; therefore, the image sensing structure 100 of the present embodiment can use the storage circuit 12 to store the two sensing signals generated by sensing diode 111 for the target object in a short time, but the present invention is not limited thereto.

Specifically, as shown in FIG. 1-2, the storage circuit 12 according to the first embodiment of the present invention is coupled to the sensing circuit 11. The storage circuit 12 is used to store the aforementioned plurality of sensing signals. In the present embodiment, the storage circuit 12 includes a storage diode 121, a storage transmission circuit 122, and a storage reset circuit 123. The storage diode 121 is coupled to the storage transmission circuit 122. As shown in FIG. 2, in the present embodiment, the storage diode 121 includes a first storage diode 1211 and a second storage diode 1212. The storage transfer circuit 122 and the storage reset circuit 123 are coupled to a floating diffusion node FD. The storage transmission circuit 122 may include MOSFETs 1221, 1222;

wherein, the first storage diode 1211 and the second storage diode 1212 are used for storing the plurality of sensing signals of different periods. The storage transmission circuit 122 is mainly controlled by the MOSFETs 1221, 1222 to store and read out signals (TX0, TX1), so as to control the charge transfer between the storage diode 121 and the floating diffusion node FD. As shown in FIG. 2, in the present embodiment, the storage reset circuit 123 is coupled between the storage diode 121 and the floating diffusion node FD, and is mainly controlled by the storage reset signal FD_RST to reset the charge stored by the storage diode 121.

Specifically, as shown in FIGS. 1-2, the processing circuit 13 according to the first embodiment of the present invention is coupled to the storage circuit 12, and the processing circuit 13 receives the sensing signals stored by the storage circuit 12. The processing circuit 13 sequentially receives a first sensing signal of the target object in a first period and a second sensing signal of a second period so as to undergo a dynamic event detection process through the first sensing signal and the second sensing signal. In other embodiments, the image processing circuit 13 can be any combination of an image signal processor (ISP), a central processing unit (CPU), a microprocessor, a digital signal processor (DSP), a programmable logic controller (PLC), an application specific integrated circuit (ASIC), a system-on-chip (SoC), or other similar components.

Figure 3:
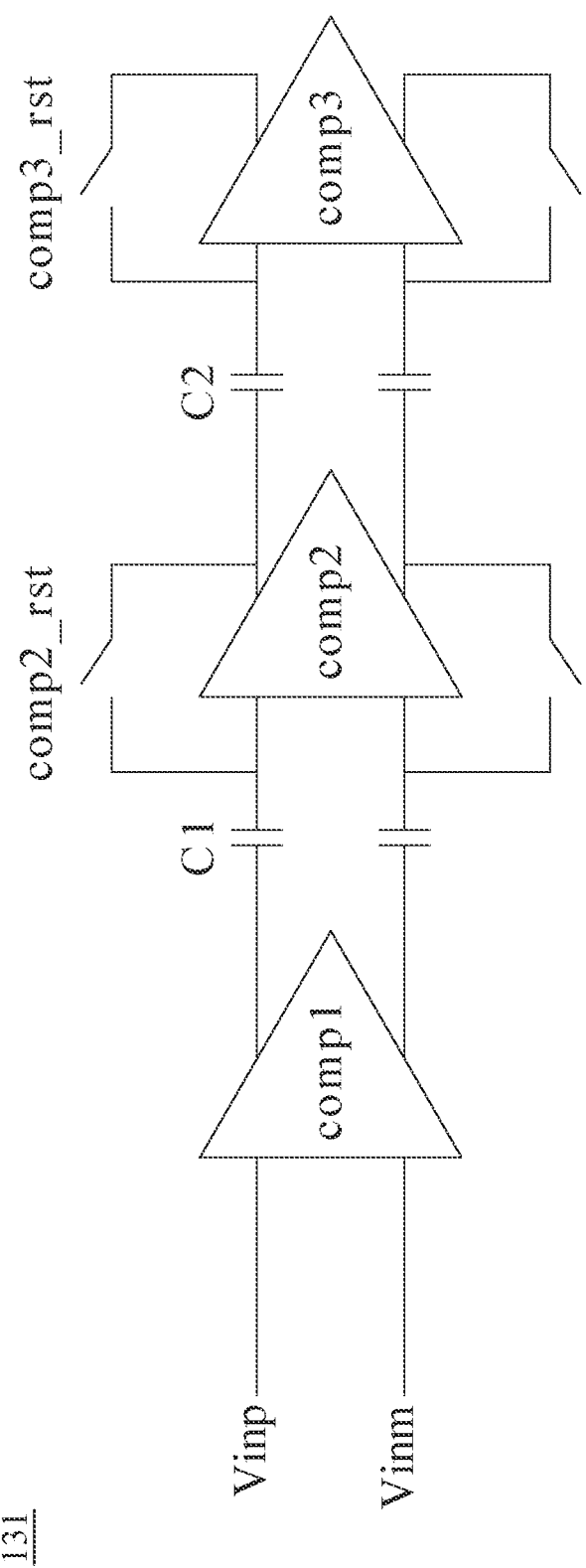
FIG. 3 is a circuit diagram illustrating a processing circuit according to the first embodiment of the present invention.

Refer to FIG. 3, which is a circuit diagram illustrating a processing circuit according to the first embodiment of the present invention. As shown in FIG. 3, the processing circuit 13 of the first embodiment of the present invention may include a dynamic offset cancellation circuit 131, which includes a plurality of comparator (comp1, comp2, comp3), a first capacitor C1, and a second capacitor C2. The dynamic offset elimination circuit 131 is mainly used to eliminate the offset generated by the comparator (comp1) in the dynamic offset elimination circuit 131, and the dynamic offset elimination circuit 131 is mainly controlled and triggered by the comparison reset signal (comp2_rst, comp3_rst) to reset the charges stored in the first capacitor C1 and the second capacitor C2, to ensure the accuracy after the first capacitor C1 and the second capacitor C2 performing the storing of the sensing signals. In addition, the dynamic offset elimination circuit 131 cooperates with the storage circuit 12 to first transmit the first sensing signal to the dynamic offset elimination circuit 131 according to the storage readout signal, and when the storage circuit 12 transmits the second sensing signal to the dynamic offset elimination circuit 131 according to the storage readout signal, the second sensing signal must overcome (i.e., subtract) the first sense signal which has been transmitted to the dynamic offset cancellation circuit 131. It can be understood that, through the first capacitor C1 and the second capacitor C2 in the dynamic offset elimination circuit 131, the present invention performs analog signal subtraction to determine whether the signals have changed before analog-to-digital conversion. Therefore, the image sensing structure 100 of the first embodiment of the present invention can store the analog sensing signals in the storage circuit 12 before the sensing signals undergo analog-to-digital conversion, and the difference between the first sensing signal and the second sensing signal can be directly generated through the dynamic offset elimination circuit 131 without an additional digital frame buffer to store the first sensing signal and the second sensing signal. It should be noted that the storage diode 121 is located in the pixel array, so no extra space and cost are required. It is worth noting that a micro-lens can be placed on the pixel array, and the storage diode 121 can be located at the non-micro-lens focal point. Therefore, the storage diode 121 will not cause the sensitivity decrease of the PD. As such, the image sensing structure 100 of the present embodiment can greatly reduce the required space and cost. However, the present invention is not limited thereto. It should be further explained that, according to the present invention, the processing circuit 13 can receive two voltage signals (Vinp, Vinm). In the present embodiment, the voltage signal Vinp can be the first sensing signal and the second sensing signal, and the voltage signal Vinm can be used as a reference value of the comparator (comp1). A better noise immunity can be obtained by using this differential method, but the present invention is not limited thereto.

Figure 4:
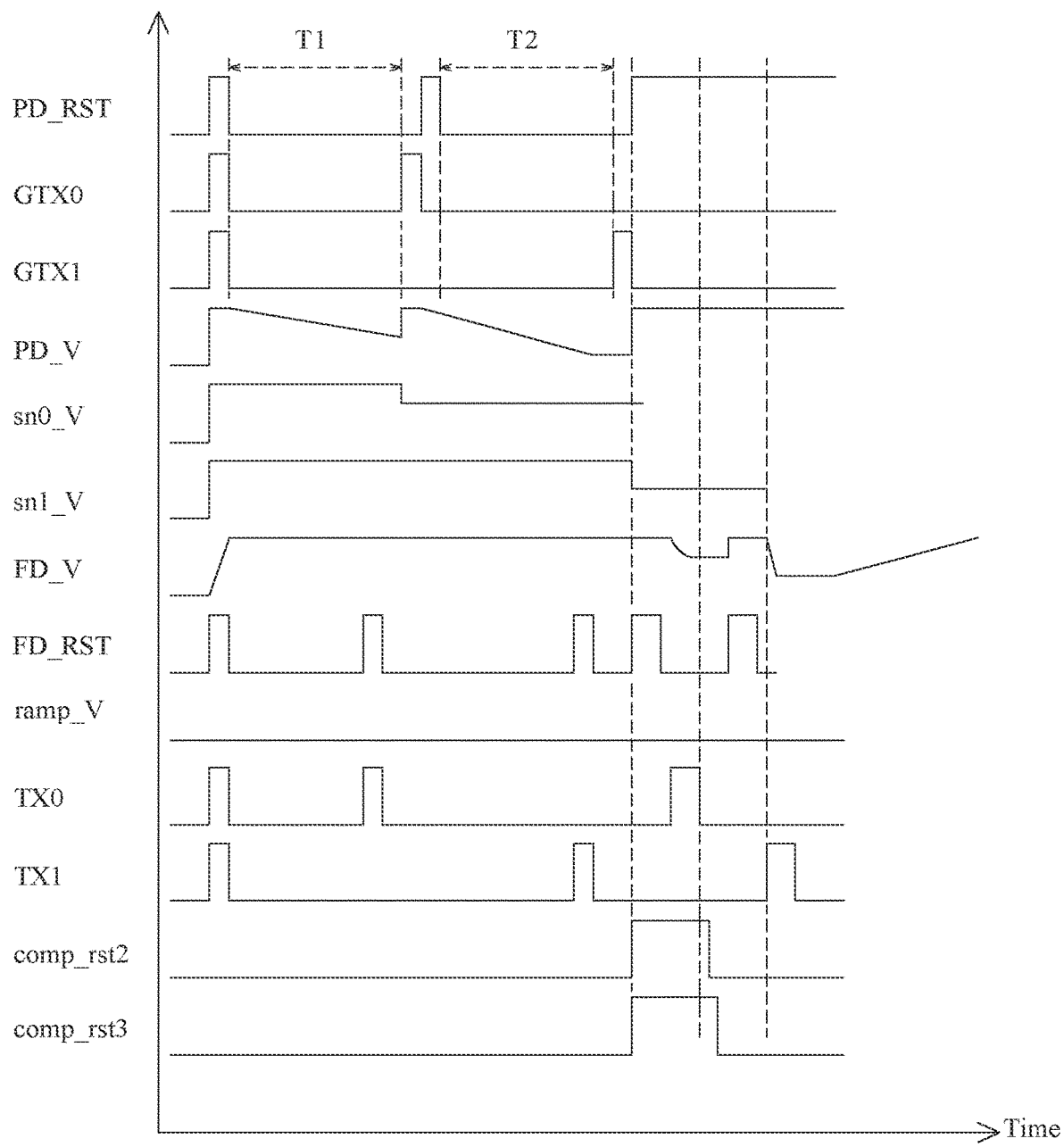
FIG. 4 is a timing diagram illustrating signals and voltages according to the first embodiment of the present invention.

Refer to FIG. 4, together with FIGS. 1-3. FIG. 4 is a timing diagram illustrating signals and voltages according to the first embodiment of the present invention. Specifically, first, the sensing reset circuit 113 of the sensing circuit 11 of the present embodiment receives the sensing reset signal PD_RST, and the sensing transmission circuit 112 of the sensing circuit 11 receives the sensing readout signals (GTX0, GTX1) respectively to control the sensing diode 111 to generate a plurality of sensing signals of different periods (T1, T2) through the sensing reset signal and the sensing readout signal. It can be understood that the sensing signals include the first sensing signal in the first period T1 and the second sensing signal in the second period T2. As shown in FIG. 4, when the sensing diode 111 generates a plurality of sensing signals of different periods, the voltage PD_V generates corresponding signals during the first period T1 and the second period T2. Afterwards, the charge stored in the storage diode 121 is respectively reset by storage reset signal FD_RST together with the storage readout signal (TX0, TX1), and the sensing transmission circuit 112 is controlled by the sensing readout signal (GTX0, GTX1) to respectively transmit the aforementioned first sensing signal and second sensing signal to the first storage diode 1211 and the second storage diode 1212 of the storage circuit 12. Finally, the field effect transistor corresponding to the storage transmission circuit 122 of the storage circuit 12 is sequentially triggered by storage readout signal (TX0, TX1) to output the first sensing signal and the second sensing signal to the dynamic offset elimination circuit 131 of the processing circuit 13. It can be understood that, as shown in FIG. 4, when the storage circuit 12 sequentially outputs the first sensing signal and the second sensing signal according to the storage readout signals (TX0, TX1), the voltage FD_V generates corresponding signals during the output period. As shown in FIG. 4, in some embodiments, the control voltage (ramp_V) according to the present invention can also control the voltage value of the voltage FD_V, but the present invention is not limited thereto.

It should be further explained that, as shown in FIG. 4, the processing circuit 13 of the present invention can store the first sensing signal into the capacitor of the dynamic offset elimination circuit 131 by comparison reset signals (comp2_rst, comp3_rst), so that the dynamic offset elimination circuit 131 generates a difference between the first sensing signal and the second sensing signal after receiving the second sensing signal. It can be understood that the image sensing structure 100 of the present invention respectively generates the first sensing signal in the first period T1 and the second sensing signal in the second period T2 through a sensing diode 111, and generates the difference between the first sensing signal and the second sensing signal through the dynamic offset elimination circuit 131 without additionally setting a digital frame buffer to store the first sensing signal and the second sensing signal. Therefore, the aforementioned first sensing signal and the second sensing signal are directly generated by the same sensing diode 111. Therefore, unlike the conventional method of subtracting signals from adjacent sensing diodes, the present invention does not generate no spatial error, and both the first sensing signal and the second sensing signal are analog signals for performing subtraction. Therefore, the image sensing structure 100 of the first embodiment of the present invention has the effects of low cost and high accuracy. It should be noted that FIG. 4 only shows a part of the operation timing of the image sensing structure 100, and the timing of reset signals, readout signals, and other signals are similar. The applicable operation sequence of the image sensing structure 100 of the present invention is not limited to FIG. 4.

Figure 5:
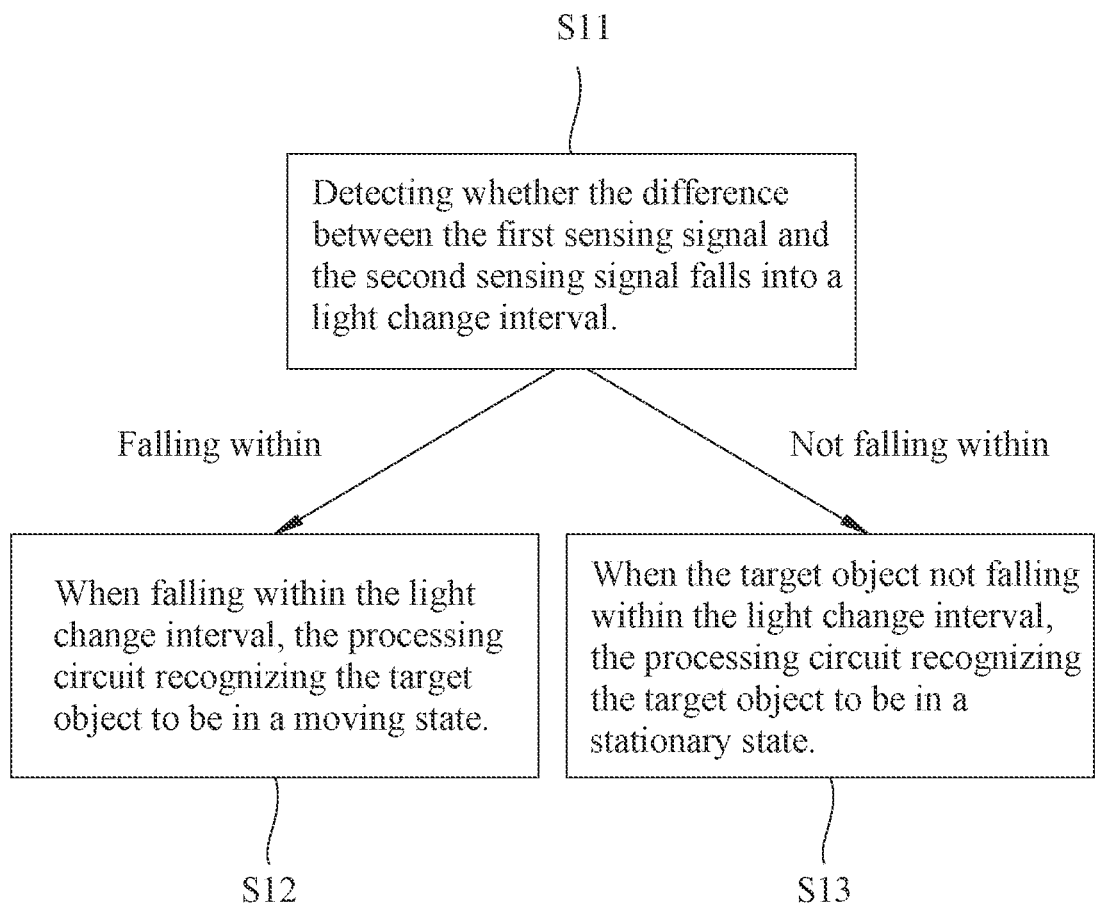
FIG. 5 is a flowchart illustrating the steps of dynamic event detection processing according to the first embodiment of the present invention.

Refer to FIG. 5. FIG. 5 is a flowchart illustrating the steps of dynamic event detection processing according to the first embodiment of the present invention. Specifically, the difference between the first sensing signal and the second sensing signal generated by the image sensing structure 100 of the first embodiment of the present invention can be directly processed by the processing circuit 13 for dynamic event detection. As shown in FIG. 5, in the present embodiment, the dynamic event detection processing performed by the processing circuit 13 may include the following steps S11-S13:

Step S11: Detecting whether the difference between the first sensing signal and the second sensing signal falls within a light change interval.

Step S12: When falling within the light change interval, the processing circuit 13 recognizing the target object to be in a moving state.

Step S13: When the target object not falling within the light change interval, the processing circuit 13 recognizing the target object to be in a stationary state.

Therefore, the image sensing structure 100 of the present embodiment can be applied to a sensor based on dynamic events, and can effectively reduce the cost and volume of the sensor to achieve wide applicability.

It is worth mentioning that, as shown in FIG. 2, the image sensing structure 100 according to the first embodiment of the present invention may further include a ramp circuit 31 coupled to the floating diffusion node FD. The ramp circuit 31 is used for converting the voltage signal of the floating diffusion node FD into a digital signal by analog-to-digital converter. In the present embodiment, the ramp circuit 31 only includes one capacitor, which is coupled to the floating diffusion node FD, but the invention is not limited thereto.

It is worth mentioning that, as shown in FIG. 2, the image sensing structure 100 according to the first embodiment of the present invention may further include an amplification selection circuit 32, and the amplification selection circuit 32 includes an amplification transistor 321, a selection transistor 322, and a signal line 323, wherein the gate of the amplifying transistor 321 is coupled to the floating diffusion node FD, and the amplification transistor 321 is coupled to the signal line 323 via the selection transistor 322; when the selection transistor 322 is controlled by an external selection signal SEL to make the selection transistor 322 in the on state, the amplification transistor 321 amplifies the voltage of the floating diffusion node FD and transmits the sensing signal to the signal line 323, but the present invention is not limited thereto.

In addition, in other embodiments, the image sensing structure 100 according to the present invention may further include a control circuit, wherein the control circuit is coupled to the sensing circuit 11 and the storage circuit 12 of the image sensing structure 100, and the control circuit is used to generate sensing readout signals, sensing reset signals, storage readout signals, and storage reset signals. In other words, the control circuit can be used to control the image sensing structure 100 to generate sensing signals in the first period T1 and the second period T2 respectively. In addition, the aforementioned sensing readout signals, sensing reset signals, storage readout signals, and storage reset signals may be, for example, pulse signals.

In summary, the image sensing structure 100 of the first embodiment of the present invention can store the sensing signals in the storage circuit 12 before the analog-to-digital conversion of the sensing signals, and the dynamic offset elimination circuit 131 can directly generate the difference between the first sensing signal and the second sensing signal in order to perform dynamic event detection processing, without additionally setting a digital frame register to store the first sensing signal and the second sensing signal. In other words, the image sensing structure 100 can effectively save the operation steps and time of image capture performed by the image sensor when determining the dynamic event, and can effectively save the power and size of the image sensing device.

Figure 6:
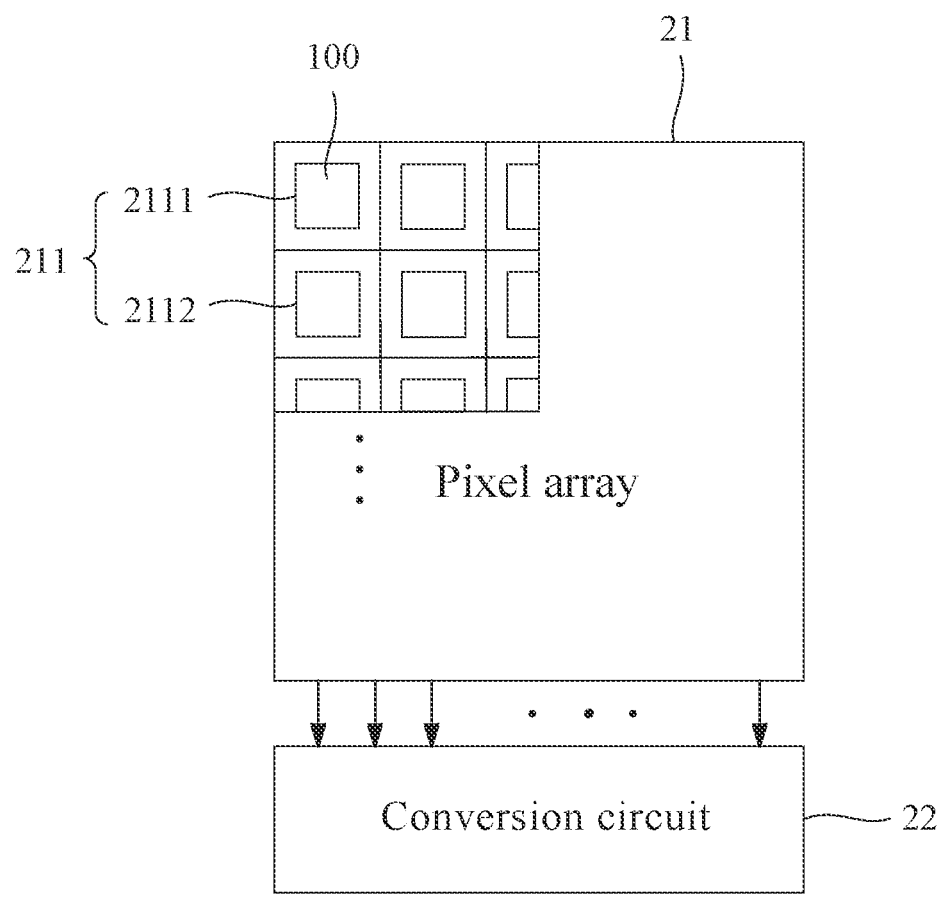
FIG. 6 is a schematic view of an image sensing device according to the present invention.

Refer to FIG. 6, which is a schematic view of an image sensing device according to the present invention. As shown in FIG. 6, the image sensing device 200 according to the present invention includes: a pixel array 21 and a conversion circuit 22. Specifically, the pixel array 21 according to the present invention includes a plurality of sensing sub-pixel sets 211, and the sensing sub-pixel sets 211 and the conversion circuit 22 are combined to form the aforementioned image sensing device 200, wherein each of the at least one sensing sub-pixel set 211 includes at least a first sensing sub-pixel 2111 and a second sensing sub-pixel 2112, and both the first sensing sub-pixel 2111 and the second sensing sub-pixel 2112 in combination with the conversion circuit 22 have the aforementioned image sensing structure 100. The first sensing sub-pixel 2111 and the second sensing sub-pixel 2112 can respectively generate the first sensing signal of the first period and the second sensing signal of the second period, and an analog signal subtraction is performed on the first sensing signal and the second sensing signal, and the first sensing sub-pixel 2111 and the second sensing sub-pixel 2112 respectively output the difference between the first sensing signal and the second sensing signal of a single sub-pixel. Specifically, the conversion circuit 22 according to the present invention is coupled to the pixel array 21, and the conversion circuit 22 is used to convert the sensing signals generated by the sensing sub-pixel set 211 into digital pixel values. As shown in FIG. 6, in the present embodiment, the sensing sub-pixel set 211 includes the first sensing sub-pixel 2111 and the second sensing sub-pixel 2112. Because both the first sensing sub-pixel 2111 and the second sensing sub-pixel 2112 in combination with the conversion circuit 22 have the aforementioned image sensing structure 100, the first sensing sub-pixel 2111 and the second sensing sub-pixel 2112 can respectively generate the first sensing signal in the first period Tl respectively, and the second sensing signal in the second period T2 respectively, and then respectively output the difference between the first sensing signal and the second sensing signal; that is, the image sensing device 200 of the present embodiment can generate sensing signals of different periods to be further processed for dynamic event detection; hence, no spatial error will be generated.

For example, the image sensing device 200 of the present embodiment may be a dynamic vision sensor (DVS). The dynamic vision sensor records information in units of events. When the dynamic vision sensor intends to determine whether the target object is in a dynamic event, the image sensing device 200 can directly detect the change in light intensity based on the difference between the first sensing signal and the second sensing signal. Therefore, the image sensing device 200 of the present embodiment can be a sensor based on dynamic events, so that the autonomy of the sensor is closer to the imaging mechanism of the human eye to generate more realistic image information, and therefore it is suitable for industrial automation, including wide applicability for vision-based high-speed applications in areas such as consumer electronics and autonomous vehicles.

Figure 7:
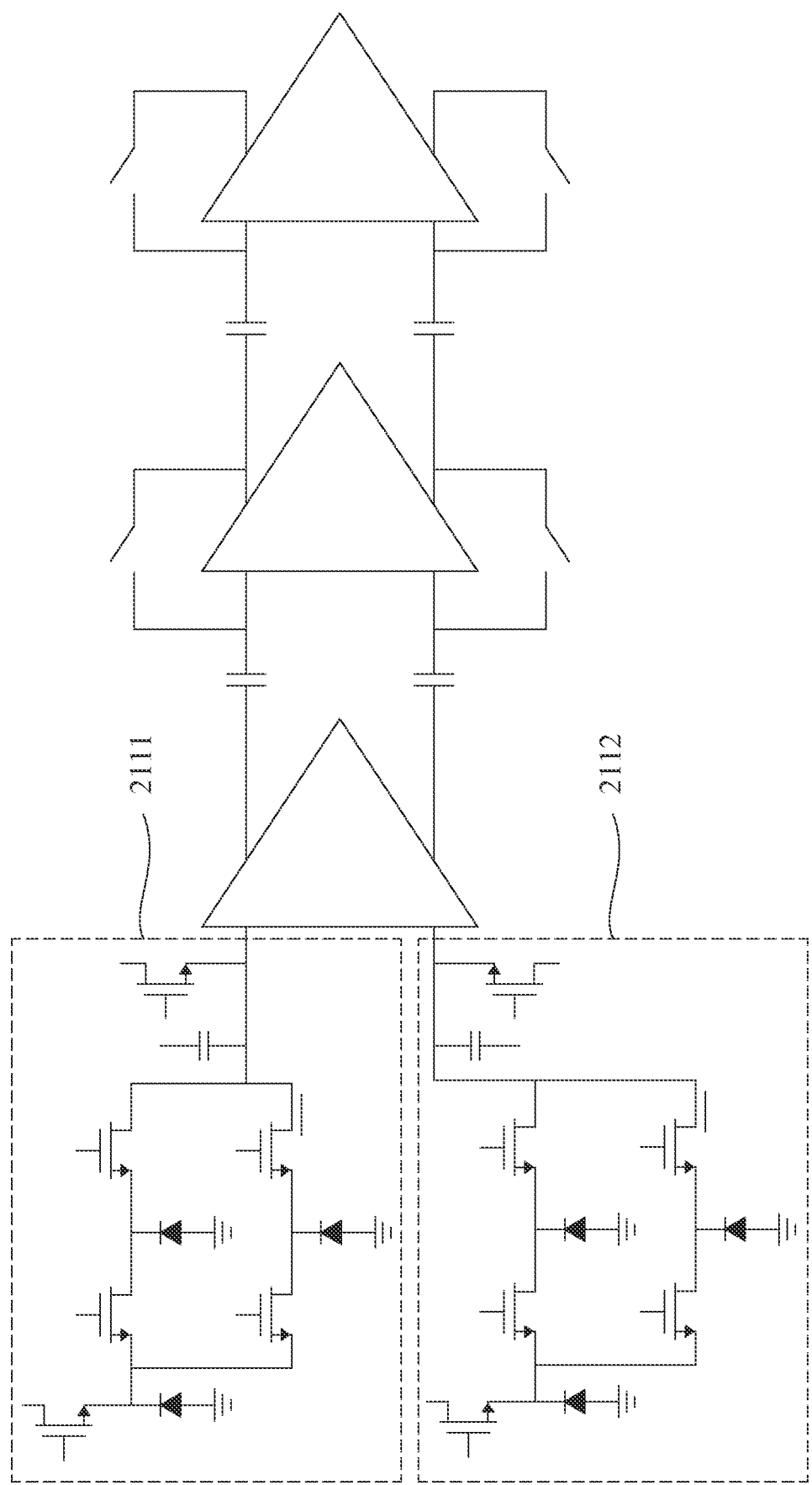
FIG. 7 is a circuit diagram of a processing circuit of an image sensing device according to the present invention.

Refer to FIG. 7, which is a circuit diagram of a processing circuit of an image sensing device according to the present invention. As shown in FIG. 6, in the present embodiment, the processing circuit 13 of the first sensing sub-pixel 2111 and the second sensing sub-pixel 2112 can share the same dynamic offset elimination circuit or part thereof, so that the second sensing signal generated by the sensing sub-pixel 2112 can be used as a comparison value when the sensing signal generated by the first sensing sub-pixel 2111 undergoes analog-to-digital conversion. In addition, the sensing signal generated by the first sensing sub-pixel 2111 can also be used as a comparison value when the sensing signal generated by the second sensing sub-pixel 2112 is converted from analog to digital. In particular, the differential circuit shown in FIG. 7 can obtain higher noise immunity, and is especially suitable for dynamic event detection to detect small signal differences. It is worth mentioning that the group of the first sensing sub-pixel 2111 and the second sensing sub-pixel 2112 may have the circuit configuration as shown in FIG. 6. However, the present invention is not limited thereto.

Specifically, in the present embodiment, the plurality of sensing diodes 111 of the plurality of sensing sub-pixels sets 211 of the image sensing device 200 perform a first global shutter exposure operation during the first period T1, and all sensing diodes 111 perform a second global shutter exposure operation during the second period T2 to avoid the Jello Effect; that is, each of the sensing diodes 111 of all sensing sub-pixels 211 on the image sensing device 200 will be exposed at the same time. However, the plurality of processing circuits 13 of the plurality of sensing sub-pixel sets 211 of the image sensing device 200 perform a rolling readout operation, but the present invention is not limited thereto.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An image sensing structure, applicable to an environment for sensing a target object, the image sensing structure comprising:
    a sensing circuit, used to generate a plurality of sensing signals of different periods;
    a storage circuit, coupled to the sensing circuit and used for storing the sensing signals; and
    a processing circuit, coupled to the storage circuit and receiving the sensing signals from the storage circuit;
    wherein, the storage circuit sequentially outputs a first sensing signal of the target object in a first period and a second sensing signal of the target object in a second period, and the processing circuit uses the first sensing signal and the second sensing signal to perform a dynamic event detection process; and
    wherein the processing circuit comprises a dynamic offset cancellation circuit for receiving a first comparison reset signal and a second comparison reset signal, the first comparison reset signal and the second comparison reset signal are respectively used to reset a first capacitor and a second capacitor in an output offset storage circuit, and the first capacitor and the second capacitor are used to store a circuit offset, the first sensing signal, and a difference between the first sensing signal and the second sensing signal.

2. The image sensing structure according to claim 1, wherein the dynamic event detection process is to detect whether the difference between the first sensing signal and the second sensing signal falls within a light-changing interval; when the difference falls into the light-changing interval, the processing circuit recognizes that the target object is in a moving state, and when the difference does not fall in the light-changing interval, the processing circuit recognizes that the target object is in a stationary state.

3. The image sensing structure according to claim 1, wherein the sensing circuit comprises:
    a sensing diode;
    a sensing transmission circuit, coupled to the sensing diode; and
    a sensing reset circuit, coupled to the sensing diode;
    wherein, the sensing reset circuit is used to receive a sensing reset signal, the sensing transmission circuit is used to receive a first sensing readout signal and a second sensing readout signal, a first time difference between the sensing reset signal and the first sensing readout signal is the first period, and a second time difference between the sensing reset signal and the second sensing readout signal is the second period.

4. The image sensing structure according to claim 1, wherein the storage circuit comprises:
    a plurality of storage diodes, coupled to a sensing transmission circuit of the sensing circuit, the plurality of storage diodes respectively storing the sensing signals of different periods;
    a plurality of storage transmission circuits, respectively coupled to the storage diodes; and
    a storage reset circuit, coupled to the storage transmission circuits;
    wherein, the storage reset circuit is used to receive a storage reset signal, the storage reset circuit is used to reset the storage diodes, the storage transmission circuits are used to receive a plurality of storage readout signals, and the storage readout signals respectively trigger the storage diodes to transmit the stored sensing signals to the processing circuit.

5. The image sensing structure according to claim 1, wherein the image sensing structure is applied to a complementary metal-oxide-semiconductor (CMOS) image sensor (CIS).

6. An image sensing device, comprising a pixel array including a plurality of sensing sub-pixel sets, each sensing sub-pixel in the sensing sub-pixel sets having an image sensing structure according to claim 1.

7. The image sensing device according to claim 6, wherein the pixel array performs a first global shutter exposure operation during the first period, and performs a second global shutter exposure operation during the second period.

8. The image sensing device according to claim 6, wherein the processing circuit performs a rolling readout operation.

9. The image sensing device according to claim 6, wherein the image sensing device is a dynamic vision sensor (DVS).

10. An image sensing structure, applicable to an environment for sensing a target object, the image sensing structure comprising:
- a sensing circuit used to generate a plurality of sensing signals of different periods, the sensing circuit having a sensing transmission circuit comprising a plurality of metal-oxide-semiconductor field-effect transistors (MOSFET) to respectively receive different sensing readout signals;
- a storage circuit coupled to the sensing circuit and having a plurality of storage diodes for storing the sensing signals and a plurality of storage transmission circuits coupled to a floating diffusion node, the sensing transmission circuit transmitting the sensing signals of different periods to the storage circuit according to a sequence of the different sensing readout signals; and
- a processing circuit coupled to the storage circuit and receiving the sensing signals from the storage circuit, the processing circuit having a dynamic offset cancellation circuit for eliminating an offset generated by a comparator in the dynamic offset cancellation circuit;

wherein the image sensing structure is located in a pixel array comprising at least one sensing sub-pixel set, each of the at least one sensing sub-pixel set including a first sensing sub-pixel and a second sensing sub-pixel, and the first sensing sub-pixel and the second sensing sub-pixel each generate a first sensing signal of the target object in a first period and a second sensing signal of the target object in a second period; and wherein the storage circuit sequentially outputs the first sensing signal in the first period and the second sensing signal in the second period, the processing circuit uses the first sensing signal and the second sensing signal to perform a dynamic event detection process by performing analog signal subtraction on the first sensing signal and the second sensing signal, and outputs a difference between the first sensing signal and the second sensing signal, and the image sensing structure further comprises a ramp circuit coupled to the floating diffusion node for converting an analog voltage signal of the floating diffusion node to a digital signal.

* * * * *